(12) United States Patent
Grangeon et al.

(10) Patent No.: US 6,228,261 B1
(45) Date of Patent: May 8, 2001

(54) APPLIANCE FOR FRAGMENTING HETEROGENEOUS ELEMENTS OF A FLUID MEDIUM FOR CIRCULATION IN A FILTER MODULE

(75) Inventors: André Grangeon, Valreas; Philippe Lescoche, Faucon, both of (FR)

(73) Assignee: Societe Anonyme: T.A.M.I. Industries (FR)

( * ) Notice: Subject to any disclaimer, the term of this patent is extended or adjusted under 35 U.S.C. 154(b) by 0 days.

(21) Appl. No.: 08/902,199

(22) Filed: Jul. 29, 1997

(30) Foreign Application Priority Data

Jul. 29, 1996 (FR) .................................................. 96 09 765

(51) Int. Cl.⁷ .................................................. B01D 63/06
(52) U.S. Cl. .................................. 210/321.79; 210/321.8; 210/321.89; 210/323.2; 210/456; 210/499
(58) Field of Search ........................... 210/321.64, 321.89, 210/321.84, 321.78, 321.79, 321.8, 321.87, 321.88, 445, 323.2, 456, 650, 652, 500.23, 497.01, 499, 322, 323.1, 335, 337, 349; 95/48, 46; 137/101.11

(56) References Cited

U.S. PATENT DOCUMENTS

| | | | |
|---|---|---|---|
| 2,157,668 | * | 5/1939 | Kidd ..................................... 210/149 |
| 4,210,536 | * | 7/1980 | Coplan et al. ........................ 210/321 |
| 4,213,856 | | 7/1980 | Blake et al. . |
| 4,588,503 | * | 5/1986 | Sugiura ................................. 210/232 |
| 4,639,353 | * | 1/1987 | Takemura et al. . |
| 4,781,831 | * | 11/1988 | Goldsmith ............................ 210/247 |
| 5,002,667 | * | 3/1991 | Kutowy et al. ................... 210/321.75 |
| 5,240,612 | * | 8/1993 | Grangeon et al. ..................... 210/636 |
| 5,626,751 | * | 5/1997 | Kikuchi et al. ................. 210/321.75 |

FOREIGN PATENT DOCUMENTS

| | | |
|---|---|---|
| 0 343 531 A1 | 11/1989 | (EP) . |
| 0 387 377 A1 | 9/1990 | (EP) . |
| WO 91/05600 | 5/1991 | (WO) . |

\* cited by examiner

*Primary Examiner*—W. L. Walker
*Assistant Examiner*—Marianne S. Ocampo
(74) *Attorney, Agent, or Firm*—Bacon & Thomas

(57) ABSTRACT

An appliance for fragmenting heterogeneous elements of a fluid medium comprising a filter module with an inlet connected to a supply line for the fluid medium including heterogeneous elements and an outlet connected to a fluid medium outlet line. The filter module comprises a series of channels inside which the fluid medium is to be circulated. The appliance further comprises a planar fragmentation device which is located upstream of the inlet and comprises passages. In accordance with the invention, the planar device constitutes a screen comprising passages which have one dimension equal to the smallest dimension of the cross section of flow of the channels divided by n, where n is in the range 1.4 to 10. The passages are formed from cutting separator elements which define the passages and have a minimum thickness in the range 0.1 mm to 2 mm to ensure fragmentation of heterogeneous elements of the fluid medium.

12 Claims, 1 Drawing Sheet

APPLIANCE FOR FRAGMENTING HETEROGENEOUS ELEMENTS OF A FLUID MEDIUM FOR CIRCULATION IN A FILTER MODULE

BACKGROUND OF THE INVENTION

1. Field of the Invention

The present invention concerns the field of material exchange or molecular or particle separation. In the above preferred field, the subject matter of the invention has a particularly advantageous application in the field of nanofiltration, ultrafiltration, microfiltration, filtration or reverse osmosis.

2. Description of the Related Art

In the material exchange field, an appliance generally comprises a filter module with an inlet connected to a supply line for a fluid medium and an outlet connected to a fluid medium outlet line. The filter module generally comprises a series of channels arranged in a rigid support inside which the fluid medium circulates.

In general, one or more channels are arranged inside tubular filter elements. Each filter element is constituted by a porous support inside which one or more channels are arranged, the internal surface of which is provided with at least one separating layer, the nature and morphology of which are adapted to separate molecules or particles contained in the liquid medium circulating in the channels. Such a filter element separates molecular species or particles from the substances to be treated by a sieving effect, where all the molecules or particles with a diameter greater than the pore diameter of the separating layer are stopped. The filter element thus divides the incoming volume into a first volume termed the "filtrate" or "permeate" containing molecules or particles which have passed through the filter element and into a second volume containing molecules or particles which have been held back by the filter element. It is thus known for an exchange apparatus forming a filter module to be constituted by a series of tubular filter elements placed side by side inside a housing. It can thus be constituted by a module containing 252 tubular filter elements with an external diameter of 10 millimeters (mm) or by 37 tubular elements with an external diameter of 25 mm.

However, the fluid to be treated includes heterogeneous elements such as bubbles or clumps of matter. Such heterogeneous elements, in a variety of sizes, can plug the circulation channels and the channel is then no longer accessible to fluid. This results in a reduction in the exchange or filter surface. Further, it has been found that such heterogeneous elements can cause the destruction of the support in which the fluid circulation channels are arranged. Such modules must be cleaned using chemical reactants which attack the matter deposited inside the channels to detach them from the porous support. However, a relatively large heterogeneous element cannot be destroyed by chemical reactants. Rather, the heterogeneous elements degrade causing a change in the volume of the heterogeneous elements which can then press on the channel walls to such an extent that the support breaks.

It has also been noticed that heterogeneous elements such as bubbles can cause destruction of the supports. Air bubbles appear in the medium to be treated due to poor filling of the appliance or to cavitation in the circulation pumps or to degassing of the fluid. If the bubbles remain in the appliance, their internal pressure can increase as they pass through the inside of the exchange module. Such an accumulation of energy inside the bubbles can cause them to depressurize all at once as a water hammer. The wave developed by the water hammer can cause the destruction of the exchange supports.

In the heat exchanger field, it is known to install an apparatus formed from a plate pierced with holes upstream of the exchanger tube inlet, the diameter of the holes being less than the cross section of flow of the exchanger tubes.

However, using such a plate in a filter module would not be entirely satisfactory. The interposition of such a plate in the fluid circulation path would cause a reduction in the performance of the module due to the pressure drop created. Further, it must be considered that the holes in that plate tend to be plugged relatively frequently by heterogeneous elements which can be deposited on the plate. This results in a drop in performance and maintenance operations must be carried out relatively frequently.

SUMMARY OF THE INVENTION

The object of the invention is thus to overcome the disadvantages defined above by providing an apparatus which can prevent heterogeneous elements in a fluid medium for circulation inside a filter apparatus from reducing the exchange surface or from destroying the filter elements.

A further object of the invention is to provide an apparatus for preventing the fluid circulation channels from becoming plugged while exhibiting a low pressure drop for the passage of fluid and which cannot be blocked by the heterogeneous elements of a fluid medium.

The invention thus aims to provide an appliance provided with a device which can fragment heterogeneous elements of a fluid medium before circulating them inside a filter module.

In accordance with the invention, the appliance comprises:

- a filter module with an inlet connected to a supply line for a fluid medium comprising heterogeneous elements and a fluid medium outlet line connected to an outlet, the filter module comprising a series of channels inside which the fluid medium is to be circulated; and
- a planar fragmentation device located upstream of the inlet to the channels and comprising passages.

According to the invention, the planar device constitutes a screen:

- comprising passages, one dimension of which is equal to the smallest dimension of the cross section of flow of the channels divided by n, where n is in the range 1.4 to 10; and
- formed from cutting separator elements defining the passages and having a minimum thickness which is in the range 0.1 mm to 2 mm, to ensure fragmentation of heterogeneous elements of the fluid medium.

BRIEF DESCRIPTION OF THE DRAWING

Various other characteristics will become apparent from the following description which is made with reference to the accompanying drawing which shows non limiting examples of embodiments and implementations of the invention.

DETAILED DESCRIPTION OF THE PREFERRED EMBODIMENT

It must be made clear that the subject matter of the invention is intended for use in a material exchange appliance 1 in the general sense. The following description relates to an appliance for material exchange, namely separation or filtration of molecules or particles contained in a fluid medium, preferably a liquid, of a variety of natures which may or may not comprise a solid phase.

Figure 1:
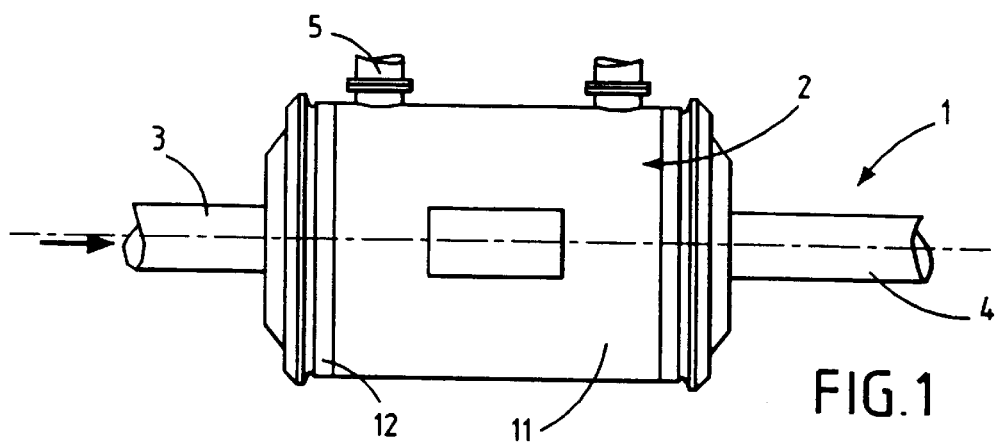
FIG. 1 is a partial schematic view of an exchange apparatus comprising a fragmentation device in accordance with the invention.

In the example shown in FIG. 1, a filter appliance 1 comprises a separation apparatus 2 forming, in the example shown, a filter module supplied with a fluid medium to be treated via a supply line 3 and with its outlet connected to a return line 4. As is conventional, the separation module 2 comprises a line 5 for recovering the portion of the fluid medium which has been separated, namely the permeate or filtrate.

Figure 2:
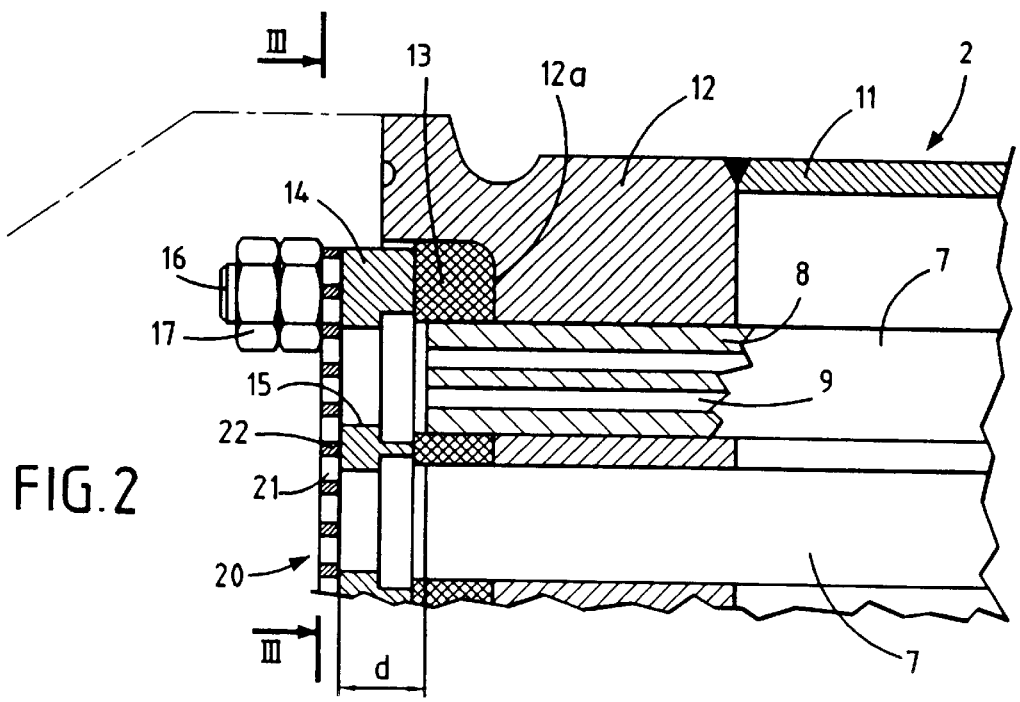
FIG. 2 is a larger scale view showing the subject matter of the invention.

As shown in more detail in FIG. 2, module 2 comprises at least one, and in the example shown a series, of tubular filter elements 7. Each filter element 7 comprises a rigid porous support 8 which is preferably but not exclusively formed from an inorganic material for which the transfer resistance is suitable for the separation to be carried out. In the preferred example, support 8 is formed from inorganic materials such as metal oxides, carbon or metals. The exterior of support 8 is cylindrical with a hexagonal transverse cross section or, as illustrated, a circular transverse cross section. Each filter element 7 comprises at least one, preferably a plurality of channels 9 formed parallel to the longitudinal axis of the support. Channels 9 each have a surface coated with at least one separating layer, which is not shown, which comes into contact with the fluid medium to be treated circulating inside channels 9. The nature of the separating layer or layers depends on the separating or filtering power to be produced and is intimately bonded with support 8 so the pressure of the liquid medium is transmitted to the porous support. Each channel 9 has a cross section which can have a variety of shapes, such as circular or pseudo-circular.

Filter elements 7 are placed inside a cylindrical housing 11, each extremity of which is provided with a plate 12 for positioning filter elements 7. As is more clearly seen in FIG. 2, elements 7 extend inside housing 11 and their ends protrude from the transverse face 12a of plates 12 fixed to the ends of housing 11. In conventional fashion, transverse face 12a of end plates 12 receives a seal 13 which surrounds the ends of tubes 7. Seal 13 is compressed by a clamping plate 14 which ensures that the tubes 7 are sealed inside housing 11. Clamping plate 14 is pierced by a series of holes 15 each aligned with or facing a filter element 7. Each clamping plate 14 is mounted on the end plate 12 via bolts 16 which extend from the end plate 12 and is fixed using nuts 17.

In accordance with the invention, appliance 1 is equipped with a planar fragmentation device 20 in accordance with the invention which fragments heterogeneous elements in the fluid medium to be treated. The term "heterogeneous elements" means clumps or particles of matter corresponding to interactions between the species present in the fluid medium or to particles taken from deposits on the walls of the appliance lines. Bubbles should also be considered to be heterogeneous elements.

The fragmentation device 20 of the invention is constituted by a screen 20 which substantially extends in one plane and which is provided with passages 21 each with one dimension which is smaller than the smallest dimension of the cross section of flow of channels 9, to ensure the passage of heterogeneous elements with dimensions which are smaller than those of channels 9. Each passage 21 also has one dimension equal to the smallest dimension of the cross section of flow of the channels 9 divided by a number n, where n is in the range 1.4 to 10, preferably in the range 2 to 4. Thus passages 21 are defined by at least one dimension which is smaller than the smallest dimension of the cross section of flow of channels 9. One dimension must be taken to correspond to a measurement which defines the geometry of channels 9 or passages 21. Thus one dimension corresponds:

for a circle, to its diameter;
for a square, to one side;
for a rectangle, to its width or its length;
for a triangle, to its height or its base;
for a regular n sided polygon, to the diameter of the circle circumscribing the sides.

Passages 21 are arranged such that the number thereof is at least equal to the number of channels 9.

Further, screen 20 comprises separator elements 22 which can delimit passages 21. The separator elements 22 each have a minimum thickness which is in the range 0.1 mm to 2 mm, preferably in the range 0.3 mm to 0.5 mm. Selecting the cross section of the separator elements 22 combined with the dimensions of passages 21 means that the heterogeneous elements can be fragmented to elements which are not likely to plug channels 9. The low value for the cross section or the thickness of the separator elements means that a screen is provided which has considerable cutting power and which has a low pressure drop for passage of the fluid medium. The separator elements 22 are cutting elements because of their relatively small thickness.

In a first embodiment, screen 20 is formed from wires for example metal wires, mounted in a crisscross pattern. In this embodiment, separator elements 22 are threadlike and are constituted by wires with a substantially constant or uniform thickness. In a further embodiment of the invention, screen 20 is formed from a plate pierced with holes each forming a passage 21 and isolated from each other by separator elements 22 constituted by the remaining material of the plate. The cross section of passages 21 can have a variety of forms, for example circular or a parallelogram. Thus the remaining material defines cutting separator elements, the thickness of which depends on the shape of passages 21. To achieve this cutting effect, the separator elements have a minimum thickness which is in the range 0.1 mm to 2 mm, preferably in the range 0.3 mm to 0.5 mm. The thickness of the separator elements is either substantially constant or uniform to constitute threadlike separation elements, or evolute and wider than its minimum thickness.

In an advantageous feature of the invention, the fragmentation screen 20 is mounted a distance d from the exchanger apparatus inlet, which distance is in the range 0 to 300 mm, preferably in the range 0 to 10 mm. The inlet to exchange module in the form of the separation apparatus 2 is taken as the plane passing through the transverse faces of filter elements 7.

Figure 3:
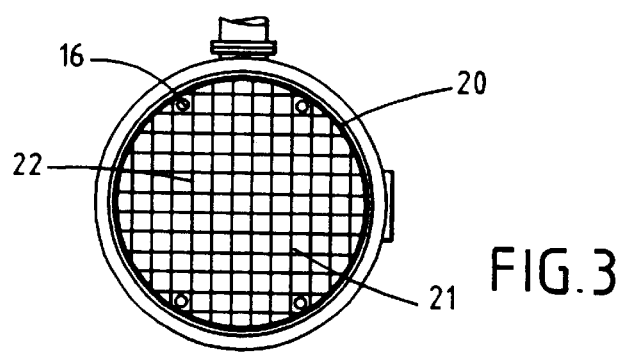
FIG. 3 is a transverse section substantially along line III—III of FIG. 2.

In a further feature of the invention, each screen 20 is mounted on clamping plate 14 on the outside of the module and on the supply line 3 side. Screen 20 has external dimensions which are substantially identical to those of clamping plate 14, as is clear in FIG. 3. This screen 20 is mounted on bolts 16 which are fixed by nuts 17. In a further variation, screen 20 constitutes the clamping plate 14.

The invention is not limited to the described and illustrated examples; a variety of modifications can be made without departing from the scope of the invention.

The present invention is by no means restricted to the above-described preferred embodiments, but covers all variations that might be implemented by using equivalent functional elements or devices that would be apparent to a person skilled in the art, or modifications that fall within the spirit and scope of the appended claims.

What is claimed is:

1. An appliance comprising:
   a filter module with an inlet connected to a supply line for a fluid medium comprising heterogeneous elements and an outlet connected to a fluid medium outlet line, the filter module comprising a series of channels inside which the fluid medium is to be circulated the channels each having an opening; and
   a planar fragmentation device located upstream of the inlet of the filter module and comprising passages through which the fluid medium must pass to enter the inlet, wherein the planar device is a screen, the screen comprising the passages, each of the passages having a dimension which is equal to the smallest dimension of the cross section of flow of the channels divided by n, wherein n is in the range 1.4 to 10, the screen is formed from cutting separator elements that define the passages and have a minimum thickness which is in the range 0.1 mm to 2 mm, to ensure fragmentation of heterogeneous elements of the fluid medium and only the heterogeneous elements fragmented by the passages of the screen are able to enter the openings of the channels.

2. An appliance according to claim 1, wherein the screen is fixed to a clamping plate which exercises pressure on a seal mounted on one end plate of the filter module to mount at least one filter element comprising the channels.

3. An appliance according to claim 2, wherein the screen constitutes the clamping plate.

4. An appliance according to claim 2, wherein the screen has external dimensions which are substantially identical to those of the clamping plate.

5. An appliance according to claim 2, wherein the clamping plate is provided with a series of holes each formed opposite a filter element in which at least one fluid medium circulation channel is arranged.

6. An appliance according to claim 1, wherein the screen is placed at a distance d which is in the range 0 to 300 mm from the channels.

7. An appliance according to claim 6, wherein the screen is placed at a distance d which is in the range 0 to 10 mm from the channels.

8. An appliance according to claim 1, wherein the screen is composed of cutting separator elements, the minimum thickness of which is in the range 0.3 mm to 0.5 mm.

9. An appliance according to claim 1, wherein one dimension of the passages is equal to the smallest dimension of the cross section of flow of the channels divided by n, wherein n is in the range 2 to 4.

10. An appliance according to claim 1, wherein the screen is formed from a plate pierced with holes defining the passages and leaving cutting separator elements.

11. An appliance according to claim 1, wherein the cutting separator elements have a substantially constant thickness.

12. An appliance according to claim 1, wherein the screen is formed from crisscrossed wires defining the cutting separator elements.

* * * * *